US011812882B2

(12) United States Patent
Moss et al.

(10) Patent No.: US 11,812,882 B2
(45) Date of Patent: Nov. 14, 2023

(54) SUPPORT BRACKET

(71) Applicant: House of Atlas, LLC, Evanston, IL (US)

(72) Inventors: Jason Moss, Libertyville, IL (US); Matthew Berman, Chicago, IL (US); Alan Arthur Ford, Sturgis, MI (US)

(73) Assignee: House of Atlas, LLC, Evanston, IL (US)

( * ) Notice: Subject to any disclaimer, the term of this patent is extended or adjusted under 35 U.S.C. 154(b) by 0 days.

(21) Appl. No.: 16/921,609

(22) Filed: Jul. 6, 2020

(65) Prior Publication Data
US 2022/0000296 A1 Jan. 6, 2022

(51) Int. Cl.
A47H 1/12 (2006.01)
A47H 1/122 (2006.01)
A47H 1/142 (2006.01)
F16M 13/02 (2006.01)

(52) U.S. Cl.
CPC .............. *A47H 1/12* (2013.01); *A47H 1/122* (2013.01); *A47H 1/142* (2013.01); *F16M 13/022* (2013.01)

(58) Field of Classification Search
CPC .......... A47H 1/142; A47H 1/122; A47H 1/12; A47H 1/102; A47H 1/14; A47H 1/13; A47H 1/124; A47H 1/10; A47H 13/01
USPC ...................................................... 248/265
See application file for complete search history.

(56) References Cited

U.S. PATENT DOCUMENTS

| | | | | |
|---|---|---|---|---|
| 355,449 A * | 1/1887 | Hardy et al. | ........... | A47H 1/122 248/265 |
| 568,048 A * | 9/1896 | Starbuck | ................ | A47H 1/122 248/265 |
| 679,677 A * | 7/1901 | Housberg | ............... | A47H 1/122 248/265 |
| 720,069 A * | 2/1903 | Reigard | ................. | A47H 1/122 248/265 |
| 770,252 A * | 9/1904 | Atterbery et al. | ....... | A47H 1/13 248/252 |
| 805,853 A * | 11/1905 | Hauk | ..................... | A47H 1/142 248/262 |
| 837,555 A * | 12/1906 | Freson | ..................... | A47H 1/13 248/254 |
| 855,311 A * | 5/1907 | Herbeck | .................. | A47H 1/13 248/254 |

(Continued)

FOREIGN PATENT DOCUMENTS

| | | | | |
|---|---|---|---|---|
| CH | 158195 A | * | 11/1932 | ............. A47H 1/142 |
| DE | 202019104560 U1 | * | 9/2019 | ............. A47H 1/144 |

(Continued)

OTHER PUBLICATIONS

"Beyond, adv., prep., and n." OED Online, Oxford University Press, Sep. 2022, www.oed.com/view/Entry/18511. Accessed Nov. 2, 2022. (Year: 1849).*

(Continued)

*Primary Examiner* — Taylor Morris
(74) *Attorney, Agent, or Firm* — Fitch Even Tabin & Flannery LLP

(57) ABSTRACT

There is disclosed brackets for hanging items such as curtain rods for supporting curtains. The brackets may be installed in various configurations. In one aspect, the brackets may be installed without making leveling measurements.

20 Claims, 5 Drawing Sheets

(56) References Cited

U.S. PATENT DOCUMENTS

| | | | | |
|---|---|---|---|---|
| 905,949 A * | 12/1908 | Stuck et al. | ............ | A47H 1/13 |
| | | | | 248/252 |
| 917,140 A * | 4/1909 | Roehm | ................ | A47H 1/142 |
| | | | | 248/263 |
| 969,051 A | 8/1910 | Garraway | | |
| 1,009,581 A * | 11/1911 | Roll et al. | ............... | A47H 1/13 |
| | | | | 248/260 |
| 1,047,092 A * | 12/1912 | Latham | .................. | A47H 1/13 |
| | | | | 248/259 |
| 1,056,621 A * | 3/1913 | Benoit | .................... | A47H 1/13 |
| | | | | 248/255 |
| 1,111,067 A * | 9/1914 | Heath | .................... | A47H 1/13 |
| | | | | 248/258 |
| 1,147,355 A * | 7/1915 | Zevin | .................... | A47H 1/13 |
| | | | | 248/257 |
| 1,194,842 A * | 8/1916 | Hunter et al. | ........ | A47H 1/13 |
| | | | | 248/258 |
| 1,231,923 A * | 7/1917 | McDevitt | ................ | A47H 1/13 |
| | | | | 248/254 |
| 1,258,514 A * | 3/1918 | Williamson | ............. | A47H 1/13 |
| | | | | 248/254 |
| 1,275,475 A * | 8/1918 | Rorick | .................... | A47H 1/13 |
| | | | | 248/256 |
| 1,292,417 A * | 1/1919 | Baer | ........................ | A47H 1/13 |
| | | | | 248/256 |
| 1,316,247 A * | 9/1919 | La Riviere | ............... | A47H 1/13 |
| | | | | 248/259 |
| 1,341,562 A * | 5/1920 | Kasbohm | ............... | A47H 1/122 |
| | | | | 248/259 |
| 1,344,298 A * | 6/1920 | Fields | .................... | A47H 1/13 |
| | | | | 248/260 |
| 1,392,405 A * | 10/1921 | Dougherty | ............... | A47H 1/13 |
| | | | | 248/258 |
| 1,461,855 A | 7/1923 | Kroesser | | |
| 1,477,272 A * | 12/1923 | Mliczek | .................. | A47H 1/13 |
| | | | | 248/260 |
| 1,481,076 A * | 1/1924 | Wloszek | .................. | A47H 1/13 |
| | | | | 248/252 |
| 1,509,470 A * | 9/1924 | Burgess | .................. | A47H 1/13 |
| | | | | 248/259 |
| 1,565,735 A * | 12/1925 | Greenhut | ................ | A47H 1/13 |
| | | | | 248/265 |
| 1,622,700 A * | 3/1927 | Boye | ..................... | A47H 1/142 |
| | | | | 248/263 |
| 1,634,364 A * | 7/1927 | Jakubiec | .................. | A47H 1/13 |
| | | | | 248/267 |
| 1,652,662 A * | 12/1927 | Dover | ................... | A47H 1/122 |
| | | | | 211/105.2 |
| D76,109 S | 8/1928 | Vermillion | | |
| 1,782,357 A * | 11/1930 | Lamoureux | ............ | A47H 1/13 |
| | | | | 248/272 |
| 1,795,657 A * | 3/1931 | Madvig | .................. | A47H 1/122 |
| | | | | 248/263 |
| 1,805,784 A * | 5/1931 | Peterson | ................ | A47H 1/142 |
| | | | | 248/254 |
| 1,817,460 A * | 8/1931 | Owsiak | .................. | A47H 1/13 |
| | | | | 248/254 |
| 1,933,719 A * | 11/1933 | Dilg | ........................ | A47H 1/122 |
| | | | | 248/265 |
| 1,954,720 A * | 4/1934 | Wanatik | .................. | A47H 1/13 |
| | | | | 248/255 |
| 1,969,913 A * | 8/1934 | Stapledon | ............ | A47H 1/142 |
| | | | | 248/263 |
| 2,056,874 A * | 10/1936 | Updegraff | ............... | A47H 1/122 |
| | | | | 248/265 |
| 2,135,159 A | 11/1938 | Zbock | | |
| 2,168,421 A * | 8/1939 | Reynolds | ................ | A47H 1/13 |
| | | | | 248/265 |
| 2,211,588 A * | 8/1940 | Wawryski | ............... | A47H 1/142 |
| | | | | 248/263 |
| 2,269,738 A * | 1/1942 | Rybicky | ................ | A47H 1/122 |
| | | | | 248/265 |
| 2,293,662 A * | 8/1942 | Richardson | ............ | A47H 1/122 |
| | | | | 160/19 |
| 2,310,928 A * | 2/1943 | Behrle | .................... | A47H 1/122 |
| | | | | 211/105.2 |
| 2,459,619 A * | 1/1949 | Chatterton | ............... | A47H 1/122 |
| | | | | 248/253 |
| 2,614,471 A * | 10/1952 | Markowitz | ............ | G03B 15/041 |
| | | | | 248/214 |
| 2,655,336 A * | 10/1953 | McGowan | ................ | A47H 1/13 |
| | | | | 235/61 PE |
| 2,679,373 A * | 5/1954 | Henley | .................... | A47H 1/142 |
| | | | | 248/262 |
| 2,762,596 A * | 9/1956 | Blechschmidt | ........ | A47H 1/122 |
| | | | | 248/265 |
| 2,848,184 A | 8/1958 | Kennedy | | |
| 2,859,879 A | 11/1958 | Rogers | | |
| 2,880,883 A * | 4/1959 | Cymara | .................. | A47H 1/102 |
| | | | | 211/105.3 |
| 2,937,838 A * | 5/1960 | Kelvington | ............ | A47H 1/122 |
| | | | | 248/265 |
| 3,049,327 A | 8/1962 | Caudell | | |
| 3,095,033 A * | 6/1963 | Polkosnik | ............... | A47H 1/122 |
| | | | | 160/345 |
| 3,104,086 A * | 9/1963 | Salzmann | ............ | A47H 1/122 |
| | | | | 248/262 |
| 3,186,400 A * | 6/1965 | Clark | ...................... | E04C 3/02 |
| | | | | 52/27 |
| 3,199,823 A * | 8/1965 | Stall | ....................... | A47H 1/122 |
| | | | | 248/265 |
| 3,241,684 A * | 3/1966 | Willsey | .................. | A47H 1/022 |
| | | | | 211/105.1 |
| 3,704,851 A * | 12/1972 | Cormier | .................. | A47H 1/10 |
| | | | | 248/265 |
| 3,907,240 A * | 9/1975 | Belli | ....................... | A47H 1/14 |
| | | | | 248/254 |
| 4,079,770 A * | 3/1978 | Woodle | .................. | A47H 2/02 |
| | | | | 160/19 |
| 4,120,474 A * | 10/1978 | Hurley | .................. | A47H 1/124 |
| | | | | 16/93 D |
| 4,140,294 A * | 2/1979 | Zwarts | .................. | A47H 1/122 |
| | | | | 248/265 |
| 4,179,091 A * | 12/1979 | Bidney | .................. | A47H 1/144 |
| | | | | 248/265 |
| 4,226,395 A | 10/1980 | Bellinger | | |
| 4,283,034 A * | 8/1981 | Sheehan | ................ | A47H 1/102 |
| | | | | 248/909 |
| 4,322,050 A * | 3/1982 | Roach | .................... | A47H 1/122 |
| | | | | 248/222.51 |
| 4,363,459 A * | 12/1982 | Holzer | .................... | E06B 9/323 |
| | | | | 248/257 |
| 4,417,712 A * | 11/1983 | DeHart | .................... | G09F 7/18 |
| | | | | 248/220.22 |
| 4,684,095 A * | 8/1987 | Athey | .................... | A47H 1/142 |
| | | | | 160/903 |
| 4,709,891 A * | 12/1987 | Barnett | .................... | G09F 7/18 |
| | | | | 248/231.71 |
| 4,809,401 A * | 3/1989 | Honig | .................... | A47H 1/022 |
| | | | | 16/87.2 |
| 4,896,881 A * | 1/1990 | Djerdjerian | ........ | A63B 21/1627 |
| | | | | 482/904 |
| 5,044,589 A * | 9/1991 | Milne | .................... | A47H 1/124 |
| | | | | 248/265 |
| 5,529,273 A * | 6/1996 | Benthin | .................. | A47H 1/142 |
| | | | | 248/254 |
| 5,577,700 A | 11/1996 | Williams | | |
| 5,871,187 A * | 2/1999 | Pihlaja | .................. | A47B 57/42 |
| | | | | 248/220.42 |
| 5,979,848 A * | 11/1999 | Kuthy | .................... | A47H 1/10 |
| | | | | 248/265 |
| 5,996,506 A * | 12/1999 | Woytovich | ............ | A47B 61/003 |
| | | | | 211/113 |
| 5,996,791 A | 12/1999 | Bibby | | |
| 6,012,690 A * | 1/2000 | Cohen | .................... | A47G 7/044 |
| | | | | 248/214 |
| 6,073,899 A * | 6/2000 | Omrani | .................. | A47K 10/185 |
| | | | | 248/905 |

(56) References Cited

U.S. PATENT DOCUMENTS

| | | | |
|---|---|---|---|
| 6,145,677 A * | 11/2000 | Corniel | D06F 95/00 |
| | | | 211/113 |
| 6,325,349 B1 | 12/2001 | Breaux | |
| 6,398,174 B1 * | 6/2002 | Emalfarb | A47G 7/044 |
| | | | 248/295.11 |
| 6,554,237 B1 | 4/2003 | Weber | |
| D478,804 S | 8/2003 | Titus | |
| 7,322,552 B1 * | 1/2008 | Lin | A47H 1/122 |
| | | | 160/89 |
| 7,648,111 B2 * | 1/2010 | Goldstein | A47H 1/142 |
| | | | 248/200.1 |
| 7,739,964 B2 * | 6/2010 | Hatton | F16M 13/02 |
| | | | 108/135 |
| D622,578 S * | 8/2010 | Kollman | D8/380 |
| 8,056,873 B1 | 11/2011 | Hanely | |
| D658,043 S | 4/2012 | Burr | |
| 8,297,576 B2 | 10/2012 | McLeod | |
| D678,754 S | 3/2013 | Burr | |
| 8,398,316 B2 * | 3/2013 | Mota | G03B 17/00 |
| | | | 248/215 |
| 8,418,975 B1 * | 4/2013 | Burr | A47H 1/142 |
| | | | 248/261 |
| D707,535 S * | 6/2014 | Burr | A47H 1/142 |
| | | | D8/363 |
| 8,851,435 B1 | 10/2014 | Bastien | |
| 9,201,291 B2 * | 12/2015 | Jorgenson | G03B 17/561 |
| D805,880 S | 12/2017 | Bright | |
| D811,205 S | 2/2018 | Hanley | |
| D813,021 S | 3/2018 | Hanley | |
| D813,022 S | 3/2018 | Hanley | |
| D813,205 S | 3/2018 | Palmborg | |
| 10,064,512 B2 * | 9/2018 | McMillion | A47H 1/102 |
| 10,070,748 B2 | 9/2018 | Hanley | |
| 10,092,126 B2 | 10/2018 | Baines | |
| 10,123,647 B1 * | 11/2018 | Mustafa | F16B 7/0433 |
| D834,925 S | 12/2018 | Hanley | |
| D834,926 S | 12/2018 | Hanley | |
| D834,927 S | 12/2018 | Hanley | |
| D847,613 S | 5/2019 | Hanley | |
| 10,278,529 B2 | 5/2019 | Baines | |
| 10,285,527 B2 | 5/2019 | Mullet | |
| D856,785 S | 8/2019 | Hanley | |
| 10,376,086 B1 * | 8/2019 | Mustafa | F16M 13/022 |
| D858,259 S | 9/2019 | Hanley | |
| D858,260 S | 9/2019 | Hanley | |
| D859,963 S | 9/2019 | Hanley | |
| 10,448,773 B2 * | 10/2019 | Muniz | A47H 1/142 |
| 10,542,835 B1 * | 1/2020 | Suozzo | A47H 1/142 |
| 10,648,492 B2 | 5/2020 | Hanley | |
| D893,284 S | 8/2020 | Hanley | |
| 10,898,020 B2 * | 1/2021 | Lee | A47G 25/0614 |
| 11,452,398 B2 * | 9/2022 | Berman | A47H 1/142 |
| 2002/0066842 A1 | 6/2002 | Curry | |
| 2004/0195477 A1 | 10/2004 | Rivellino | |
| 2007/0029050 A1 * | 2/2007 | Nien | E06B 9/262 |
| | | | 160/84.01 |
| 2007/0257172 A1 * | 11/2007 | Kelly | A47H 1/142 |
| | | | 248/253 |
| 2012/0018602 A1 * | 1/2012 | Cattaneo | A47B 95/008 |
| | | | 248/225.21 |
| 2012/0217362 A1 * | 8/2012 | Affonso | A47H 1/142 |
| | | | 248/222.14 |
| 2013/0043357 A1 | 2/2013 | McLeod | |
| 2013/0082017 A1 * | 4/2013 | Tang | A47H 1/02 |
| | | | 211/124 |
| 2013/0099080 A1 * | 4/2013 | Baines | A47H 1/142 |
| | | | 248/262 |
| 2015/0108304 A1 | 4/2015 | Larsen Roldan | |
| 2015/0238027 A1 * | 8/2015 | Yeh | A47G 1/1653 |
| | | | 248/307 |
| 2015/0265086 A1 | 9/2015 | Hanley | |
| 2016/0242586 A1 * | 8/2016 | Mateer | A47H 1/142 |
| 2018/0014680 A1 | 1/2018 | Hanley | |
| 2018/0064279 A1 | 3/2018 | Hanley | |
| 2018/0078073 A1 * | 3/2018 | Morris | F16B 2/08 |
| 2018/0098656 A1 | 4/2018 | Baines | |
| 2018/0306219 A1 | 10/2018 | Hanley | |
| 2019/0099034 A1 | 4/2019 | Hanley | |
| 2019/0282017 A1 | 9/2019 | Hanley | |
| 2020/0200199 A1 | 6/2020 | Hanley | |
| 2020/0217338 A1 | 7/2020 | Hanley | |
| 2020/0305629 A1 * | 10/2020 | Hanley | A47H 1/142 |
| 2021/0100388 A1 * | 4/2021 | James | A47H 1/142 |
| 2021/0219764 A1 * | 7/2021 | Berman | A47H 1/142 |
| 2021/0345808 A1 * | 11/2021 | Berman | F16B 13/04 |

FOREIGN PATENT DOCUMENTS

| | | | | |
|---|---|---|---|---|
| EP | 3069637 | A1 * | 9/2016 | A47H 1/13 |
| FR | 2895892 | A1 * | 7/2007 | A47H 1/142 |
| GB | 191207285 | A * | 9/1912 | A47H 1/142 |

OTHER PUBLICATIONS

Kwik-hang. "Single Curtain Rod Brackets." <https://kwikhang.com/products/single-bracket>, known at least prior to Jul. 6, 2020, 6 pages.

* cited by examiner

SUPPORT BRACKET

FIELD

The subject matter relates to brackets and, more particularly, to brackets, such as curtain rod brackets, that are quick and easy to install.

BACKGROUND

Curtain rod brackets can be difficult to install. Often curtain rods are supported by two or more brackets at an upper portion of a window. If the brackets are not level with respect to each other, a curtain rod resting upon the brackets will be crooked with respect to the window. Care must be taken to ensure the brackets are installed horizontally which requires accurate measurements. Many curtain rod brackets are installed with screws and, therefore, installation requires the use of tools, such as a drill. Installation, thus, often requires the assistance of a professional installer having the proper installation tools and expertise. There is a desire to make installation of curtain rod brackets easier so that homeowners can readily install curtain rods systems adequately without the assistance of a professional installer.

Others have developed curtain rods that use brackets that may be mounted to a window frame by a homeowner without the need for measurements. However, these brackets lack the adaptability and adjustability to be used in other applications. For example, these brackets can only be mounted to the top of a window frame and are not adapted to also be mounted directly to a wall.

Thus, there is a need for curtain rod system that is easily installed, adjustable, and may be used in multiple applications.

DETAILED DESCRIPTION

Figure 1:
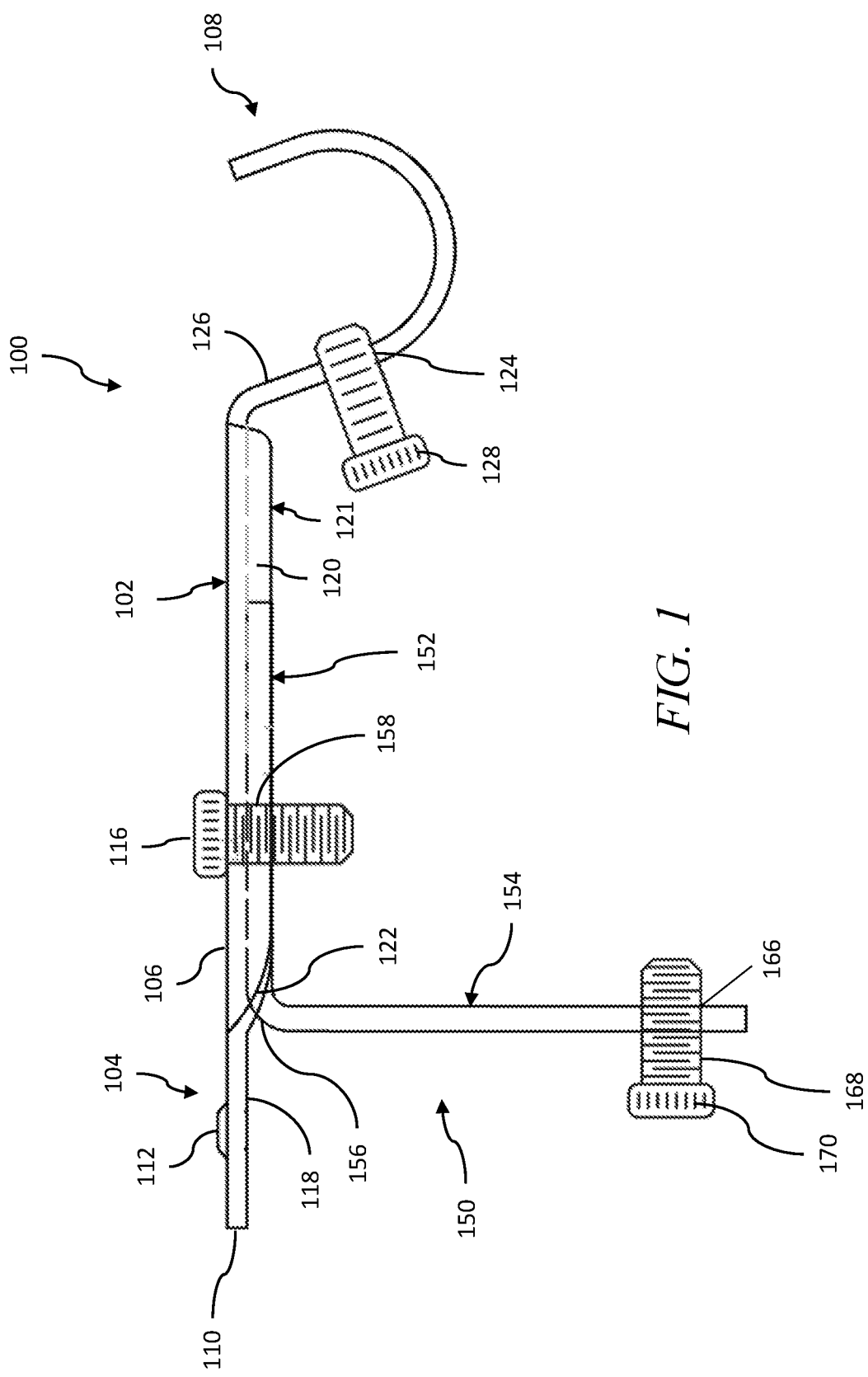
FIG. 1 is a left side elevation view of a curtain rod support bracket.

Regarding FIG. 1, there is illustrated a curtain rod bracket 100 that may be installed on a window frame, without making any measurements or, alternatively, in a more traditional fashion using tools. In mounting the rod bracket 100 without making measurements, one can take advantage of the window frame or trim that is already horizontal and defines the window size. The bracket can be attached to the window frame or trim at the lateral edges of the window. As explained in more detail below, the bracket 100 includes a rod support arm 102 and an angle support bracket 150.

Figure 2A:
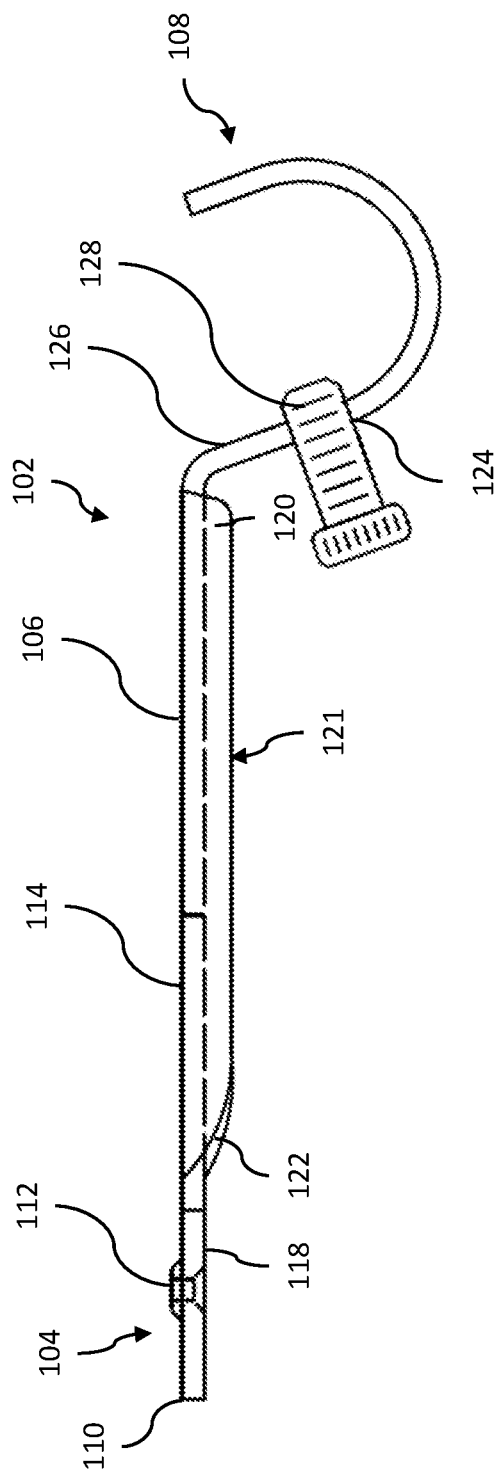
FIG. 2A is a left side elevation view of a rod support arm of the curtain rod bracket of FIG. 1.
Figure 2B:
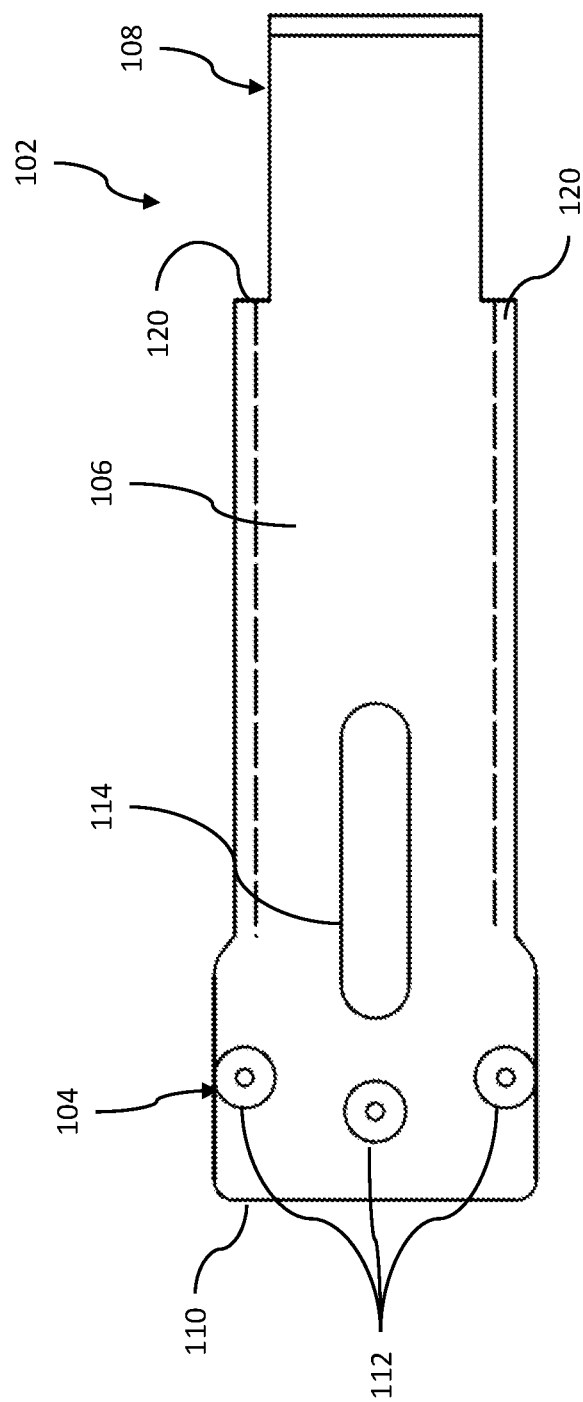
FIG. 2B is a top plan view of the rod support arm of FIG. 2A.
Figure 2C:
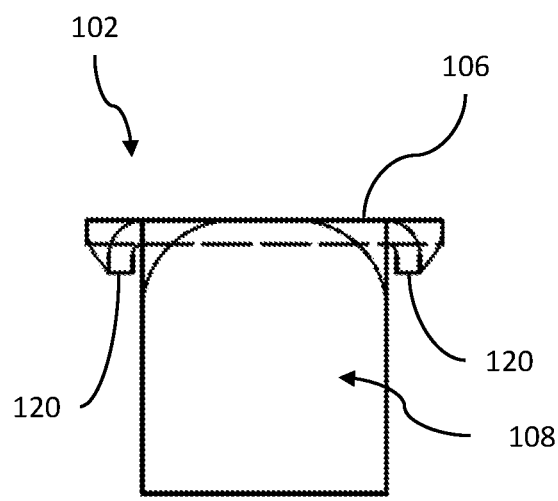
FIG. 2C is a front elevation view of the rod support arm of FIG. 2A.
Figure 3B:
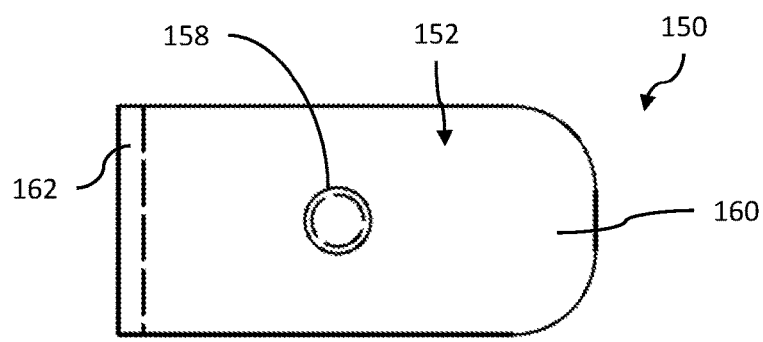
FIG. 3B is a top plan view of the angle support bracket of FIG. 3A.
Figure 3A:
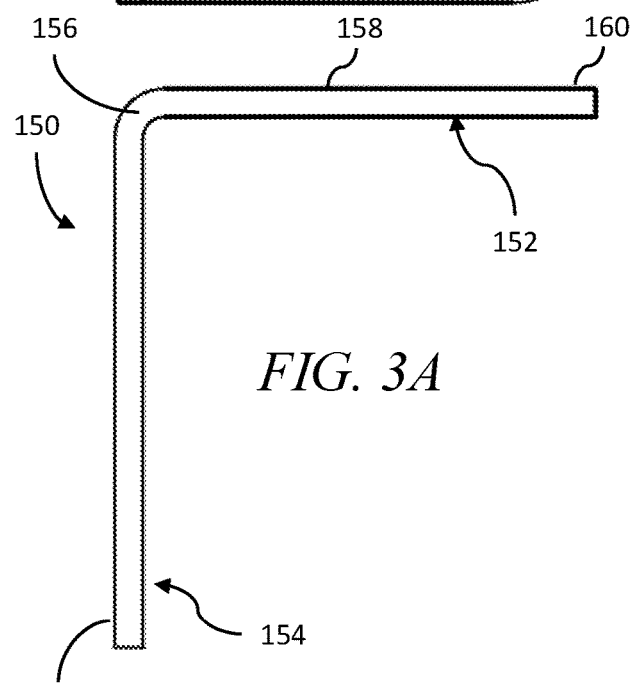
FIG. 3A is a left side elevation view of an angle support bracket of the curtain rod bracket of FIG. 1.
Figure 3C:
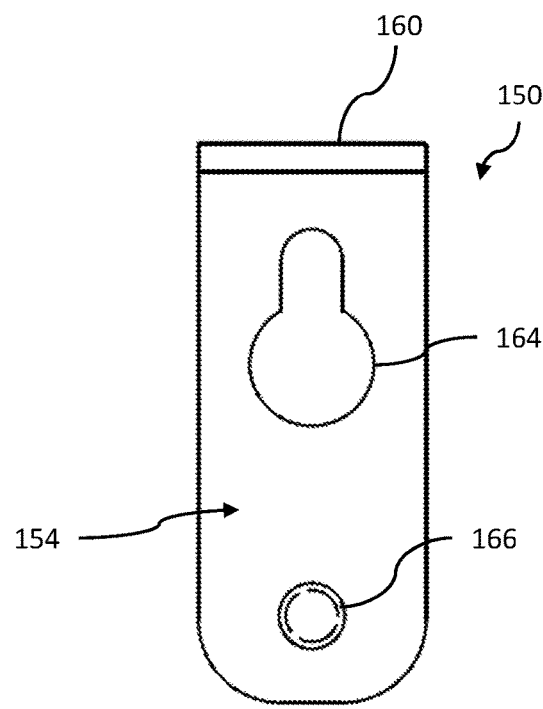
FIG. 3C is a front elevation view of the angle support bracket of FIG. 3A.

With reference to FIGS. 1-2C, the rod support arm 102 includes an attachment portion 104, a top plate 106, and a cradle 108. The attachment portion 104 may be mounted to the top surface of a window frame or trim. A back edge 110 of the rod support arm 102 may be brought into contact with a wall during installation to ensure that the rod support arm is mounted perpendicular to a wall. The attachment portion 104 includes holes 112 through which fasteners, such as nails or screws, may be inserted into the window frame to hold the rod support arm 102 to the window frame. Alternatively, the attachment portion 104 may be mounted to the wall via an adapter.

The top plate 106 is planar and extends from the attachment portion to the cradle 108. The top plate 106 includes a slot 114 extending from the attachment portion 104 toward the cradle 108. A screw 116 may be inserted through the slot 114 to attach the rod support arm 102 to the angle support bracket 150. When attached, the bottom surface 118 of the rod support arm 102 rests on a bracket support leg 152 of the angle support bracket 150. The slot 114 allows the angle support bracket 150 to be fixed at any relative position along the slot 114 to accommodate various window frame thicknesses or when bracket 100 is mounted directly to a wall, explained in more detail below. Side portions 120 extend perpendicularly from the edges of the top plate 106. The side portions 120 gives the top plate 106 of the rod support arm 102 greater load capacity for the cradle 108 relative to an arm without such side portions. The side portions 20 combined with the top plate 106 create a channel 121 that prevents rotational movement between the rod support arm 102 and the angle support bracket 150 and guides reciprocal movement between the rod support arm 102 and the angle support bracket 150, as explained below. The side portions 120 include arcuate rearward edges 122.

The cradle 108 has a generally U-shaped cross-section and opens upward when the bracket 100 is installed on the wall. The cradle 108 is shown angled backwards, although the cradle may open directly upward or angle forward. The cradle 108 includes a threaded hole 124 in a back segment 126 thereof through which a screw 128 is inserted. The screw 128 may be adjusted to secure a curtain rod in the cradle 108 from unintentional lateral motion and removal of the curtain rod from the cradle 108. The screw 128 engages a curtain rod and pins it against the front of the cradle 108.

With reference to FIGS. 1 and 3A-C, the angle support bracket 150 includes the bracket support leg 152 and a surface support leg 154. The bracket support leg 152 and surface support leg 154 meet at elbow 156 at approximately a right angle. The bracket support leg 152 is planar and extends from the elbow 156. The bracket support leg 152 includes a threaded hole 158 extending therethrough. The threaded hole 158 includes threads complementary to the screw 116 that extends through slot 114 of the rod support arm 102. The top surface 160 of the bracket support leg 152 engages the bottom surface 118 of the rod support arm 102. The bracket support leg 152 may slide longitudinally along the rod support arm 102 to adjust the longitudinal distance between the back edge 110 of the rod support arm 102 and a back surface 162 of the surface support leg 154. The channel 121 guides the bracket support leg 152 as it slides longitudinally along the rod support arm 102 to prevent lateral movement of the bracket support leg 152. The screw 116 may be tightened to fix the relative position of the angle support bracket 150 to the rod support arm 102.

The surface support leg 154 includes back surface 162 that may contact a surface such as a wall or window frame upon installation. The surface support leg 154 may further include a slot 164 and a threaded hole 166. As shown in the embodiment shown in FIG. 3C, the slot 164 may be a keyhole slot. The slot 164 may be used when bracket 100 is mounted directly to a wall and not to a window frame. The threaded hole 166 receives a screw 168. Screw 168 includes a head 170 that engages a surface such as a wall, a window frame, or trim once installed. Screw 168 may be turned to increase or decrease the distance between the surface and the surface support leg 154. Once installed, increasing the distance between the surface and the surface support leg 154 tips the cradle upward. Decreasing the distance between the surface and the surface support leg 154 lowers the cradle. The screw 168 may be adjusted until the top plate 106 of the rod support arm 102 is level.

In one non-limiting example, the rod support arm 102 has a maximum width of 0.950 inches and a length of 3.135 inches from the back edge 110 to the center of the cradle 108. The cradle has a radius of 0.323 inches. The slot 114 of the rod support arm 102 has a length of 0.729 inches. The holes 112 of the attachment portion 104 have a radius of 0.180 inches. The angle support bracket 150 has a width of 0.652 inches, a length of 1.375 inches, and a height of 1.600 inches. The holes 158, 166 of the angle support bracket 150 have a radius of 0.188 inches.

The rod support arm 102 and an angle support bracket 150 may be made from 0.063 inches thick steel.

The bracket 100 may be installed according to different methods to achieve various installation configurations. In a first configuration, the attachment portion 104 of the rod support arm 102 is attached to the top surface of a window frame or trim. Attachment portion 104 of the rod support arm 102 may be positioned on the top surface of a window frame. The back edge 110 of the rod support arm 102 may be brought into contact with the wall behind the window frame or trim. One or more fasteners, such as nails or screws, may be inserted into the holes 112 to secure the rod support arm 102 to the window frame or trim. In this configuration, the angle support bracket 150 is not attached to the support arm.

When additional support for heavy loads is required, the angle support bracket 150 may be used. In this second configuration, the bracket support leg 152 may be positioned within the channel formed by the top plate 106 and the side portions 120 such that the top surface 160 of the bracket support leg 152 abuts the bottom surface 118 of the rod support arm 102. The screw 116 may be inserted through the slot 114 and into the threaded hole 158 of the bracket support leg 152. The screw 168 may be inserted into threaded hole 166 of the angle support bracket 150 from the back surface 162 of the surface support leg 154. The head 170 of screw 168 may be brought into contact with the window frame. The angle support bracket 150 may be adjusted longitudinally to bring the head 170 of screw 168 into contact with the window frame trim. The screw 116 may then be tightened to prevent further longitudinal movement of the angle support bracket 150 relative to the rod support arm 102.

The screw 168 may then be turned to increase or decrease the distance between the surface support leg 154 and the window frame or trim, thereby adjusting the angle of the rod support arm 102 relative to the wall. In some embodiments, it may be desired for the rod support arm 102 to extend perpendicularly from the wall. The screw 168 may be adjusted until the desired angle between the rod support arm 102 and the wall has been set. One or more brackets 100 may be installed on another portion of the window frame similar to the process described above. A curtain rod may then be placed within the cradles 108 of the brackets 100. The screws 128 may be inserted into threaded holes 124 and adjusted to lock the curtain rod against the front of the cradles 108.

In third configuration, the head 170 of the screw 168 is not positioned between the surface support leg 154 and the window frame. Rather, the back surface 162 of the surface support leg 154 is brought into contact with the window frame or trim. The installer may hold the rod support arm 102 to the desired angle relative to the wall and insert the screw 168 through the hole 166 and into the window frame thereby setting the angle of the rod support arm 102 relative to the wall.

In a fourth configuration, the rod support arm 102 is not attached to the top edge of a window frame or trim. Instead, the angle support bracket 150 is fixed to a surface, such as a wall, at the back surface 162 of the surface support leg 154. Fasteners, such as nails or screws, may be inserted into the wall through the slot 164 and the hole 166. Alternatively, a screw may be inserted into the wall and the large portion of the keyhole slot 164 may be positioned over screw and slid downward such that the narrow portion of the keyhole slot 164 is behind the head of the screw. The surface support leg 154 may be positioned vertically with another screw inserted through hole 166 and into the wall. The rod support arm 102 may be attached to the angle support bracket 150 by inserting screw 116 through slot 114 and into threaded hole 158 of the angle support bracket 150. The position of the rod support arm 102 may be adjusted and then fixed in place relative to the angle support bracket 150 by tightening screw 116 against top plate 106 of the rod support arm 102. The back edge 110 of the rod support arm 102 may be, for example, brought into contact with the wall before screw 116 is tightened. One or more brackets 100 may be installed along a wall in this configuration, with a curtain rod being positioned within the cradles 108 and screws 128 adjusted to lock the curtain rod against the front of the cradle 108.

While the installation methods disclosed herein are described as being performed in a certain order, those having skill in the art will readily understand that the methods are not so limited.

The matter set forth in the foregoing description and accompanying drawings is offered by way of illustration only and not as a limitation. While embodiments have been shown and described, it will be apparent to those skilled in the art that modifications may be made without departing from the broader aspects of the technological contribution. The actual scope of the protection sought is intended to be defined in the following claims.

What is claimed is:

1. An apparatus for hanging items, the apparatus comprising:
an arm including an attachment portion for mounting to a top of a structure about a window, an upper planar surface extending along a first plane, and a terminal end extending in the first plane, and the attachment portion defining at least one mounting aperture for a fastener to attach to the top of the structure;
a receptacle with at least two open sides extending about an axis extending through the receptacle and parallel to a length dimension of the terminal end and connected to an end portion of the arm opposite the attachment portion, the receptacle and the arm being a single piece;
a bracket having at least a first leg and a second leg, the first leg and the second leg being connected to one another, the first leg supporting the arm, a first adjustment screw for adjusting the second leg relative to the structure to adjust a position of the receptacle;
the first adjustment screw having an enlarged end facing away from the receptacle to engage the structure; and the second leg defines a threaded hole to receive the first adjustment screw.

2. The apparatus of claim 1 wherein the first adjustment screw is capable of engaging the structure and being turned against the structure to adjust the position of the receptacle.

3. The apparatus of claim 1 wherein the first leg is disposed at a right angle to the second leg.

4. The apparatus of claim 1 wherein the receptacle is configured to receive a rod.

5. An apparatus for hanging items, the apparatus comprising:
an arm including an attachment portion for mounting to a top of a structure about a window, an upper planar surface extending along a first plane, and a terminal end extending in the first plane, and the attachment portion defining at least one mounting aperture for a fastener to attach to the top of the structure;
a receptacle connected to an end portion of the arm opposite the attachment portion;
a bracket having at least a first leg and a second leg, the first leg and the second leg being connected to one another, the first leg having a maximum length and being in contact with at least a portion of the arm with all of the maximum length;
the second leg being adjustable relative to the structure to arcuately adjust the receptacle from a first position to a second position;
the receptacle extending at least in part along the second leg and past the support arm;
a first adjustment screw; and
the second leg defines a threaded hole to receive the first adjustment screw, the first adjustment screw capable of engaging the structure and being turned against the structure to arcuately adjust from the first position to the second position.

6. The apparatus of claim 5 further comprising a second adjustment screw and wherein the arm defines a slot and the first leg defines a corresponding hole or the arm defines the corresponding hole and the first leg defines the slot, the second adjustment screw extending through the corresponding hole and slot and used to fix a position of the arm relative to the first leg.

7. The apparatus of claim 6 wherein the position of the first leg of the bracket being moveable relative to the attachment portion by moving the second adjustment screw to a first position that enables movement of the first leg relative to the arm and to a second position that clamps the first leg against movement relative to the arm.

8. The apparatus of claim 5 wherein the first adjustment screw protrudes from the second leg of the bracket, a distance between an end of the first adjustment screw and the second leg being adjustable by rotation of the first adjustment screw.

9. An apparatus for hanging items, the apparatus comprising:
a support arm including a plate defining at least one hole for mounting to a structure about a window, an upper planar surface extending along a first plane, and a terminal end extending in the first plane, and a receptacle, the receptacle connected to a first end of the plate opposite the terminal end and having an opening facing upward;
a support bracket including a first leg connected to a second leg, the first leg adjustably attached to the plate, the first leg having a maximum length and being in contact with at least a portion of the support arm with all of the maximum length, the receptacle extending at least in part along the second leg and past the support arm, and wherein the first leg is parallel to the first plane, the second leg including a first aperture and a second aperture for mounting to a structure;
at least one elongated fastener configured to extend through at least one of the first aperture and the second aperture for mounting the apparatus to a surface, the at least one elongated fastener having a first end and a second end, the second end being larger than the first end; and
wherein the apparatus is capable of being mounted to a structure using the plate.

10. The apparatus of claim 9 further comprising an adjustment fastener and wherein the plate defines a slot, the first leg defines a third aperture, the adjustment fastener extending through the slot of the plate and the third aperture of the first leg and having a first position to permit adjustment of the plate relative to the first leg and a second position to clamp the plate to the first leg against relative movement therebetween.

11. The apparatus of claim 9 wherein the at least one elongated fastener comprises an adjustment screw threaded into the first aperture of the second leg of the support bracket, the second end of the adjustment screw protruding from the second leg to engage a structure, whereby as the adjustment screw is turned the receptacle moves from a first position to a second position relative to the structure.

12. The apparatus of claim 9 wherein the at least one hole includes a plurality of holes for mounting the apparatus to a structure about a window.

13. The apparatus of claim 12 wherein the plurality of holes for mounting the apparatus to a structure about a window are staggered.

14. The apparatus of claim 9 wherein the first leg is connected to the second leg such that the second leg is substantially perpendicular to the plate.

15. The apparatus of claim 9 wherein the receptacle is configured to receive a rod.

16. The apparatus of claim 9 wherein at least a portion of the plate forms a channel receiving the first leg of the support bracket.

17. The apparatus of claim 9 wherein the second aperture is elongated.

18. The apparatus of claim 9 wherein the plate includes elongated flanges to provide support to the plate.

19. The apparatus of claim 18 wherein the first leg extends between the elongated flanges.

20. The apparatus of claim 9 wherein the receptacle angles toward the plate.

* * * * *